United States Patent
Matsuo et al.

(10) Patent No.: US 9,988,298 B2
(45) Date of Patent: Jun. 5, 2018

(54) HIGH-TRANSPARENCY GLASS

(71) Applicant: ASAHI GLASS COMPANY, LIMITED, Chiyoda-ku (JP)

(72) Inventors: Yusaku Matsuo, Tokyo (JP); Yutaka Kuroiwa, Tokyo (JP); Yusuke Arai, Tokyo (JP); Hiroyuki Hijiya, Tokyo (JP); Yuki Kondo, Tokyo (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 0 days. days.

(21) Appl. No.: 15/408,803

(22) Filed: Jan. 18, 2017

(65) Prior Publication Data

US 2017/0121215 A1 May 4, 2017

Related U.S. Application Data

(63) Continuation of application No. PCT/JP2015/071166, filed on Jul. 24, 2015.

(30) Foreign Application Priority Data

Aug. 1, 2014 (JP) .................................. 2014-157627
May 13, 2015 (JP) .................................. 2015-097826

(51) Int. Cl.
*C03C 3/087* (2006.01)
*C03C 3/091* (2006.01)

(52) U.S. Cl.
CPC .............. *C03C 3/087* (2013.01); *C03C 3/091* (2013.01)

(58) Field of Classification Search
CPC .......... C03C 3/083; C03C 3/085; C03C 3/087
See application file for complete search history.

(56) References Cited

U.S. PATENT DOCUMENTS 6,407,021 B1 * 6/2002 Kitayama ............... C03C 3/095
501/70
6,548,434 B2 * 4/2003 Nagashima ............. C03C 3/087
501/64

(Continued)

FOREIGN PATENT DOCUMENTS

JP    2003-95691    4/2003
JP    2003-160354   6/2003
JP    4087113       5/2008

OTHER PUBLICATIONS

International Search Report dated Oct. 27, 2015 in PCT/JP2015/071166 filed on Jul. 24, 2015 (with English translation).

(Continued)

*Primary Examiner* — Noah S Wiese
(74) *Attorney, Agent, or Firm* — Oblon, McClelland, Maier & Neustadt, L.L.P.

(57) ABSTRACT

The present invention provides a high-transparency glass having a high fining action at a low temperature and capable of achieving redox lowering more than before. The present invention relates to a glass containing 1 to 500 ppm of a total iron oxide (t-$Fe_2O_3$) in terms of $Fe_2O_3$, having a redox ([divalent iron ($Fe^{2+}$) in terms of $Fe_2O_3$]/[total ($Fe^{2+}+Fe^{3+}$) of divalent iron ($Fe^{2+}$) and trivalent iron ($Fe^{3+}$) in terms of $Fe_2O_3$]) of 0% or more and 25% or less, containing, as expressed by mass percentage based on oxides, 50 to 81% of $SiO_2$, 1 to 20% of $Al_2O_3$, 0 to 5% of $B_2O_3$, 5 to 20% of $Li_2O+Na_2O+K_2O$, and 5 to 27% of $MgO+CaO+SrO+BaO$, and having a bubble disappearance-starting temperature (TD) of 1485° C. or lower.

20 Claims, 1 Drawing Sheet

(56) References Cited

U.S. PATENT DOCUMENTS

| | | | | |
|---|---|---|---|---|
| 6,844,280 B2* | 1/2005 | Koyama | ................. | C03C 3/087 |
| | | | | 257/E31.041 |
| 7,144,837 B2* | 12/2006 | Landa | .................... | C03C 1/004 |
| | | | | 501/64 |
| 7,169,722 B2* | 1/2007 | Landa | .................... | C03C 3/087 |
| | | | | 501/71 |
| 7,601,660 B2* | 10/2009 | Tullman | ................. | C03C 3/095 |
| | | | | 501/70 |
| 8,664,132 B2* | 3/2014 | Shelestak | ................ | C03C 3/087 |
| | | | | 501/70 |
| 2003/0114291 A1 | 6/2003 | Koyama et al. | | |
| 2003/0125188 A1 | 7/2003 | Koyama et al. | | |
| 2003/0144126 A1* | 7/2003 | Kitayama | ............... | C03C 3/095 |
| | | | | 501/70 |
| 2004/0157722 A1 | 8/2004 | Koyama et al. | | |
| 2004/0162212 A1 | 8/2004 | Koyama et al. | | |
| 2013/0295366 A1* | 11/2013 | Murata | ................. | C03C 3/093 |
| | | | | 428/220 |

OTHER PUBLICATIONS

Written Opinion dated Oct. 27, 2015 in PCT/JP2015/071166 filed on Jul. 24, 2015.

* cited by examiner

HIGH-TRANSPARENCY GLASS

TECHNICAL FIELD

The present invention relates to a glass. In particular, it relates to a glass having a high transparency.

BACKGROUND ART

A high-transparency glass having a high visible light transmittance (so-called white sheet glass) is in demand in various uses. For example, in building uses (interior materials and exterior materials), electronic equipment uses (a light guide material for a planar light-emitting device, so-called light guide plate), and other industrial uses (a cover glass for a solar power generation module), there are using methods for efficiently transmitting a visible light to enhance light utilization efficiency, for utilization as a material that provides a high design effect (high grade feeling), and the like.

In the field of use where an acrylic plate has been hitherto used as a light guide plate, in the case where a high-transparency glass is applied as a light guide plate, there have been revealed problems that light absorption inside the glass in the visible light region (wavelength: 380 to 780 nm) cannot be ignored as light path length increases and thus a decrease in luminance and in-plane luminance/color unevenness occur. In addition, it has also been revealed that product properties are remarkably lowered even by a small amount of bubble defects.

A main factor of the light absorption is an iron ion contained as an impurity. The iron ion exists as a divalent one ($Fe^{2+}$) and a trivalent one ($Fe^{3+}$) in a glass but particularly problematic one is $Fe^{2+}$ that has broad absorption in the wavelength of 490 to 780 nm.

$Fe^{3+}$ has an absorption band in the wavelength of 380 to 490 nm but the influence thereof is small since an extinction coefficient thereof per unit concentration is small by one digit as compared to that of $Fe^{2+}$. Therefore, in order to reduce the light absorption in the visible region, there is necessary a means for lowering the ratio of the $Fe^{2+}$ content to the total iron ion content in the glass as far as possible, that is, for decreasing redox.

In an industrially manufactured glass plate, it is substantially difficult to reduce the iron content contained as an impurity to such a degree that the transmittance of the glass plate becomes the same as that of an acrylic plate, and thus, in order to solve the above problem under the constraint condition, it is inevitable to lower the redox more than before.

Since it is known that the redox increases as the melting condition of the glass becomes higher temperature due to the influence of heat reduction, glass melting at a lower temperature is preferable for redox lowering. On the other hand, when the melting temperature of the glass is lowered, fining at melting remarkably decreases and bubble quality of the glass to be produced cannot be maintained.

SUMMARY OF THE INVENTION

Problems that the Invention is to Solve

In order to solve the problems in the aforementioned background art, an object of the present invention is to provide a high-transparency glass having a high fining action at a low temperature and capable of achieving redox lowering more than before.

Means for Solving the Problems

The present invention is as follows.
1. A glass containing 1 to 500 ppm of a total iron oxide (t-$Fe_2O_3$) in terms of $Fe_2O_3$, having a redox ([divalent iron ($Fe^{2+}$) in terms of $Fe_2O_3$]/[total ($Fe^{2+}+Fe^{3+}$) of divalent iron ($Fe^{2+}$) and trivalent iron ($Fe^{3+}$) in terms of $Fe_2O_3$]) of 0% or more and 25% or less, containing, as expressed by mass percentage based on oxides:
$SiO_2$ 50 to 81%,
$Al_2O_3$ 1 to 20%,
$B_2O_3$ 0 to 5%,
$Li_2O+Na_2O+K_2O$ 5 to 20%, and
$MgO+CaO+SrO+BaO$ 5 to 27%, and
having a bubble disappearance-starting temperature (TD) of 1485° C. or lower.
2. A glass containing 1 to 500 ppm of a total iron oxide (t-$Fe_2O_3$) in terms of $Fe_2O_3$, containing, as expressed by mass percentage based on oxides:
$SiO_2$ 50 to 81%,
$Al_2O_3$ 1 to 20%,
$B_2O_3$ 0 to 5%,
$Li_2O+Na_2O+K_2O$ 5 to 20%, and
$MgO+CaO+SrO+BaO$ 5 to 27%,
having a value of D represented by the following expression (1) of 0 or more, and having a bubble disappearance-starting temperature (TD) of 1485° C. or lower.

$$D=4\times[SiO_2]+8\times[Al_2O_3]+2\times[MgO]-1\times[CaO]-2\times[SrO]-2\times[BaO]-8\times[Na_2O]-12\times[K_2O]-180 \quad (1)$$

(In the expression (1),
[$SiO_2$] is the content of $SiO_2$
[$Al_2O_3$] is the content of $Al_2O_3$
[MgO] is the content of MgO
[CaO] is the content of CaO
[SrO] is the content of SrO
[BaO] is the content of BaO
[$Na_2O$] is the content of $Na_2O$, and
[$K_2O$] is the content of $K_2O$, and all of them are expressed by mass percentage based on oxides.)
3. A glass containing 1 to 500 ppm of a total iron oxide (t-$Fe_2O_3$) in terms of $Fe_2O_3$, containing, as expressed by mass percentage based on oxides:
$SiO_2$ 50 to 81%,
$Al_2O_3$ 1 to 20%,
$B_2O_3$ 0 to 5%,
$Li_2O+Na_2O+K_2O$ 5 to 20%, and
$MgO+CaO+SrO+BaO$ 5 to 27%,
in which when a bubble density B is defined as that in a glass body obtained by melting glass raw materials at a temperature of 1550° C., followed by forming into a sheet and then annealing, the bubble density B is 10 pieces/kg or less.
4. The glass according to the above 3, in which a ratio (B/A) of the bubble density B to a bubble density A is $10^{-3}$ or less, in which the bubble density A is defined as that in a glass body obtained by melting glass raw materials at a temperature of 1350° C., followed by forming into a sheet and then annealing.
5. The glass according to any one of the above 1 to 4, containing 0 to 50 ppm of divalent iron ($Fe^{2+}$) in terms of $Fe_2O_3$.
6. The glass according to any one of the above 1 to 5, containing 1 to 10% of the $Al_2O_3$ as expressed by mass percentage.
7. The glass according to any one of the above 1 to 6, in which the $Li_2O+Na_2O+K_2O$ is 5 to 15%.

8. The glass according to any one of the above 1 to 7, in which the MgO+CaO+SrO+BaO is 13 to 27%.
9. The glass according to any one of the above 1 to 8, containing, as expressed by mass percentage based on oxides:
   $SiO_2$ 50 to 81%,
   $Al_2O_3$ 1 to 10%,
   $B_2O_3$ 0 to 5%,
   $Li_2O$ 0 to 5%,
   $Na_2O$ 5 to 15%,
   $K_2O$ 0 to 7.5%,
   MgO 0 to 15%,
   CaO 0 to 15%,
   SrO 0 to 15%,
   BaO 0 to 15%,
   $Li_2O+Na_2O+K_2O$ 5 to 15%, and
   MgO+CaO+SrO+BaO 13 to 27%.
10. The glass according to any one of the above 1 to 9, which is substantially free from $B_2O_3$.
11. The glass according to any one of the above 1 to 10, containing more than 0% and 0.5% or less of $SO_3$ as expressed by mass percentage.
12. The glass according to any one of the above 1 to 11, containing 0 to 1% of $SnO_2$ as expressed by mass percentage.
13. The glass according to any one of the above 1 to 12, containing $Sb_2O_3$ or $As_2O_3$ in an amount of 0 to 0.5% as expressed by mass percentage.
14. The glass according to any one of the above 1 to 13, containing 0 to 0.05% of $CeO_2$ as expressed by mass percentage.
15. The glass according to any one of the above 1 to 14, having a temperature (T2) at which a viscosity of a glass melt reaches $10^2$ dPa·s of 1550° C. or lower.
16. The glass according to any one of the above 1 to 15, in which a difference (Tc-T4) between a devitrification temperature (Tc) and a temperature (T4) at which a viscosity of a glass melt reaches $10^4$ dPa·s is 100° C. or lower.
17. The glass according to any one of the above 1 to 16, which is a glass sheet.
18. The glass according to the above 17, in which the glass sheet has a minimum value of an inner transmittance in a wavelength range of 400 to 700 nm under a condition of a light path length of 200 mm being 80% or more, and a difference between a maximum value and the minimum value of the inner transmittance being 15% or less.
19. The glass according to the above 17 or 18, in which the glass sheet has a length of at least one side thereof of 200 mm or more and a thickness of 0.5 mm or more.
20. A method for producing the glass sheet according to any one of the above 17 to 19, including melting glass materials to obtain a molten glass and forming the molten glass by using any one forming method selected from the group consisting of a float process, a roll-out process, a pulling-up process, and a fusion process to obtain a glass sheet, in which a maximum melting temperature in melting the glass raw materials is in a range of the bubble disappearance-starting temperature (TD) of the glass to TD+150° C.

Advantage of the Invention

By using the glass of the present invention, the melting temperature in production can be lowered without influencing product quality and, as a result, a glass containing a less amount of $Fe^{2+}$ that has a large influence on light absorption in the visible region can be obtained.

MODES FOR CARRYING OUT THE INVENTION

The present invention provides a glass (A) containing 1 to 500 ppm of a total iron oxide (t-$Fe_2O_3$) in terms of $Fe_2O_3$, having a redox ([divalent iron ($Fe^{2+}$) in terms of $Fe_2O_3$]/[total ($Fe^{2+}+Fe^{3+}$) of divalent iron ($Fe^{2+}$) and trivalent iron ($Fe^{3+}$) in terms of $Fe_2O_3$]) of 0% or more and 25% or less, containing, as expressed by mass percentage based on oxides:
$SiO_2$ 50 to 81%,
$Al_2O_3$ 1 to 20%,
$B_2O_3$ 0 to 5%,
$Li_2O+Na_2O+K_2O$ 5 to 20%, and
MgO+CaO+SrO+BaO 5 to 27%, and
having a bubble disappearance-starting temperature (TD) of 1485° C. or lower.

Moreover, the present invention provides a glass (B) containing 1 to 500 ppm of a total iron oxide (t-$Fe_2O_3$) in terms of $Fe_2O_3$, containing, as expressed by mass percentage based on oxides:
$SiO_2$ 50 to 81%,
$Al_2O_3$ 1 to 20%,
$B_2O_3$ 0 to 5%,
$Li_2O+Na_2O+K_2O$ 5 to 20%, and
MgO+CaO+SrO+BaO 5 to 27%,
having a value of D represented by the following expression (1) of 0 or more, and having a bubble disappearance-starting temperature (TD) of 1485° C. or lower.

$$D = 4 \times [SiO_2] + 8 \times [Al_2O_3] + 2 \times [MgO] - 1 \times [CaO] - 2 \times [SrO] - 2 \times [BaO] - 8 \times [Na_2O] - 12 \times [K_2O] - 180 \quad (1)$$

(In the expression (1),
$[SiO_2]$ is the content of $SiO_2$,
$[Al_2O_3]$ is the content of $Al_2O_3$,
[MgO] is the content of MgO,
[CaO] is the content of CaO,
[SrO] is the content of SrO,
[BaO] is the content of BaO,
$[Na_2O]$ is the content of $Na_2O$, and
$[K_2O]$ is the content of $K_2O$,
and all of them are expressed by mass percentage based on oxides.)

Furthermore, the present invention provides a glass (C) containing 1 to 500 ppm of a total iron oxide (t-$Fe_2O_3$) in terms of $Fe_2O_3$, containing, as expressed by mass percentage based on oxides:
$SiO_2$ 50 to 81%,
$Al_2O_3$ 1 to 20%,
$B_2O_3$ 0 to 5%,
$Li_2O+Na_2O+K_2O$ 5 to 20%, and
MgO+CaO+SrO+BaO 5 to 27%, in which a bubble density B in a glass body obtained by melting glass raw materials at a temperature of 1550° C., followed by forming into a sheet and then annealing, is 10 pieces/kg or less.

The following will describe glasses (A) to (C) of the present invention.

There is described a compositional ranges of individual components which are common to the glasses (A) to (C) of the present invention.

$SiO_2$ is a main component of the glass. In order to keep weather resistance and devitrification properties of the glass, the content of $SiO_2$ is controlled to 50% or more as expressed by mass percentage based on oxide (hereinafter, unless particularly specified, % means mass percentage based on oxide). It is preferably 60% or more, more preferably 65% or more and further preferably 67% or more. However, in order to facilitate melting, the content of $SiO_2$ is controlled to 81% or less. Moreover, in order to suppress the content of divalent iron ($Fe^{2+}$) in the glass low, improve optical properties, and improve bubble quality, it is controlled to 81% or less. It is preferably 75% or less, more preferably 74% or less and further preferably 72% or less.

$Al_2O_3$ is an essential component that improves weather resistance of the glass. In order to maintain practically necessary weather resistance in the compositional system of the present invention, $Al_2O_3$ should be contained in an amount of 1% or more. It is preferably 1.5% or more and more preferably 2.5% or more. However, in order to suppress the content of divalent iron ($Fe^{2+}$) low, improve optical properties, and improve bubble quality, the content of $Al_2O_3$ is controlled to 20% or less. The content of $Al_2O_3$ is preferably 10% or less, more preferably 8% or less and further preferably 5% or less.

$B_2O_3$ is a component that promotes melting of glass raw materials and improves mechanical properties and weather resistance. However, in order to prevent occurrence of inconveniences such as formation of ream and erosion of furnace walls resulting from evaporation due to the addition to a soda-lime silicate-based glass like the glasses (A) to (C) of the present invention, the content is controlled to 5% or less. It is preferably 2% or less and more preferably 1% or less, and further preferably, the glass is substantially free from the component. Hereinafter, "substantially free from" in the present description means that "not contain except unavoidable impurities".

Alkali metal oxides such as $Li_2O$, $Na_2O$ and $K_2O$ are components useful for promoting the melting of the glass raw materials and adjusting thermal expansion, viscosity or the like. Therefore, the total content of these alkali metal oxides ($Li_2O+Na_2O+K_2O$) is controlled to 5% or more. It is preferably 7% or more, more preferably 9% or more and further preferably 10% or more.

However, in order to suppress the bubble disappearance-starting temperature (TD) to be mentioned later to a low temperature, maintain fining in melting, and keep the bubble quality of the glass to be produced, $Li_2O+Na_2O+K_2O$ is controlled to 20% or less. $Li_2O+Na_2O+K_2O$ is preferably 15% or less, more preferably 13.5% or less, further preferably 13% or less, still further preferably 12.5% or less, and particularly preferably 12% or less.

$Li_2O$ is a component useful for promoting the melting of the glass raw material and adjusting thermal expansion, viscosity, or the like. However, in order to facilitate vitrification, suppress an iron-contamination amount (content of iron contained as an impurity) derived from the raw material low, and suppress a batch cost low, it is preferably 5% or less, more preferably 2.5% or less, further preferably 2% or less, and most preferably 1% or less.

$Na_2O$ is a component useful for promoting the melting of the glass raw material and adjusting thermal expansion, viscosity, or the like. It is preferably 5% or more, more preferably 7% or more, further preferably 9% or more, and particularly preferably 10% or more. However, in order to suppress the bubble disappearance-starting temperature (TD) to be mentioned later to a low temperature, maintain fining in melting, and keep the bubble quality of the glass to be produced, it is controlled to 15% or less. It is preferably 13.5% or less, more preferably 13% or less, particularly preferably 12.5% or less, and further preferably 12% or less.

$K_2O$ is a component useful for promoting the melting of the glass raw material and adjusting thermal expansion, viscosity, or the like. However, in order to maintain the weather resistance and devitrification properties of the glass, it is preferably 7.5% or less and more preferably 5% or less. Moreover, in order to suppress a batch cost, it is preferably 3% or less and particularly preferably 2% or less.

Alkaline earth metal oxides such as MgO, CaO, SrO, and BaO are components useful for promoting the melting of the glass raw materials and adjusting thermal expansion, viscosity, or the like. Therefore, the total content of these alkaline earth metal oxides (MgO+CaO+SrO+BaO) is controlled to 5% or more. It is preferably 11% or more, more preferably 13% or more, further preferably 14% or more, still further preferably 14.5% or more, and particularly preferably 15% or more.

However, in order to suppress the thermal expansion coefficient low, improve the devitrification properties, and maintain strength, MgO+CaO+SrO+BaO is controlled to 27% or less. It is preferably 25% or less, more preferably 23.5% or less and further preferably 22% or less.

MgO has actions of lowering viscosity in glass melting and promoting the melting. Moreover, since it has actions of reducing specific gravity and preventing the glass from being scratched, it can be added for enlargement of a light guide plate part of an edge light type liquid crystal television. In order to lower the thermal expansion coefficient of the glass and improve the devitrification properties, it is preferably 15% or less, further preferably 12% or less, preferably 7.5% or less, and more preferably 5% or less. Further preferred is 3% or less and most preferred is 2% or less.

CaO is a component that promotes the melting of the glass raw materials and adjusts viscosity, thermal expansion, or the like and hence can be contained. In order to obtain the above actions, it is preferably contained in an amount of 3% or more and more preferably contained in an amount of 5% or more, and the content is further preferably 6% or more and particularly preferably 7% or more. In order to improve the devitrification properties, it is preferably 15% or less, more preferably 14% or less and further preferably 13% or less.

SrO has effects of increasing the thermal expansion coefficient and lowering high-temperature viscosity of the glass. In order to obtain the above effects, it is preferably contained in an amount of 2% or more. However, in order to suppress the thermal expansion coefficient of the glass low, it is preferably 15% or less, more preferably 8% or less and further preferably 6% or less.

BaO has effects of increasing the thermal expansion coefficient and lowering high-temperature viscosity of the glass, like SrO. In order to obtain the above effects, it is preferably contained in an amount of 2% or more. However, in order to suppress the thermal expansion coefficient of the glass low, it is preferably 15% or less, more preferably 8% or less and further preferably 6% or less.

In the glass raw materials, $Fe_2O_3$ is contained as an unavoidable impurity. For the glass to be used as the light guide plate part of an edge light type liquid crystal television, it is substantially difficult to reduce $Fe_2O_3$ in the glass raw materials to a level at which light absorption inside the glass does not become a problem in the visual light region (wavelength: 380 to 780 nm). The glasses (A) to (C) of the present invention contain total iron oxide (t-$Fe_2O_3$) in terms of $Fe_2O_3$ in an amount of 1 to 500 ppm.

In the glasses (A) and (B) of the present invention, when the compositional ranges of individual components satisfy the above, the bubble disappearance-starting temperature (TD) becomes 1485° C. or lower. In the present description, the bubble disappearance-starting temperature (TD) is a physical property correlating with two factors of "growth of bubble diameter (fining agent-decomposing characteristic) and "bubble floating (high-temperature viscosity of glass)", and is defined by the following method.

Figure 1:
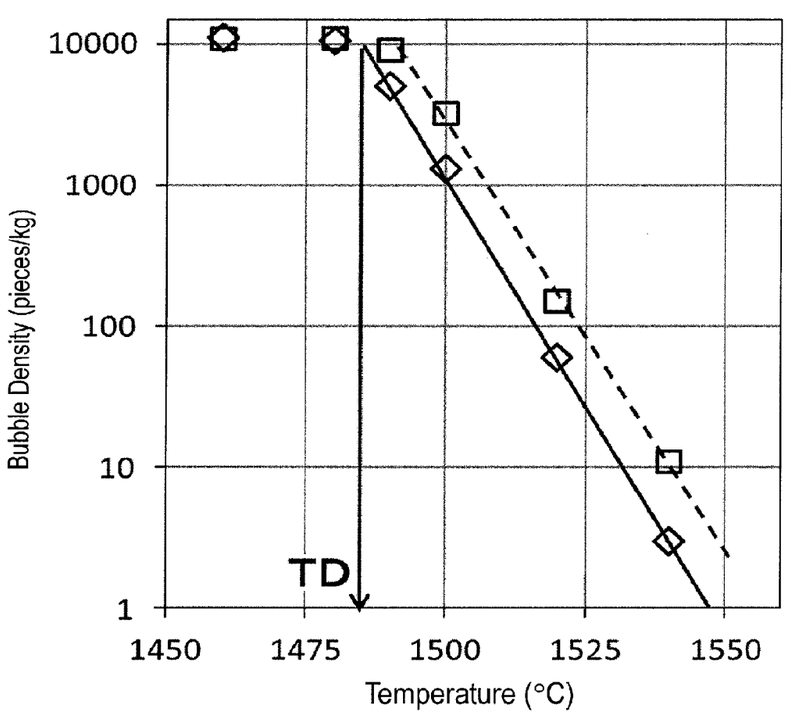
FIG. 1 is a diagram for illustrating bubble disappearance-starting temperature (TD).

In a crucible, a glass is rapidly cooled after melting for a certain time with changing maximum melting temperature, the number of remaining bubbles is count, and bubble density is calculated. The melting of the glass to be used in the test may be performed with raw materials or a cullet. When the results are plotted against temperature, as illustrated in FIG. 1 there exists an inflection point at which the bubble density rapidly starts to decrease. The inflection point is defined as the bubble disappearance-starting temperature (TD).

When the bubble disappearance-starting temperature (TD) is 1485° C. or lower (solid line in FIG. 1), a fining action is increased and bubble quality at low-temperature melting is improved (for example, the bubble density in melting at 1550° C. becomes less than 1 piece/kg), so that redox lowering of the glass can be achieved. When TD exceeds 1485° C. (broken line in FIG. 1), for example, at the melting at 1550° C., the bubble quality gets worse and hence it becomes necessary to perform melting at a higher temperature, so that it becomes difficult to lower the redox of the glass.

In the glasses (A) and (B) of the present invention, the bubble disappearance-starting temperature (TD) is preferably 1480° C. or lower, more preferably 1475° C. or lower and most preferably 1465° C. or lower.

The glass (A) of the present invention can achieve the redox lowering of the glass when the bubble disappearance-starting temperature (TD) is 1485° C. or lower, and the redox ([divalent iron ($Fe^{2+}$) in terms of $Fe_2O_3$]/[total ($Fe^{2+}$+$Fe^{3+}$) of divalent iron ($Fe^{2+}$) and trivalent iron ($Fe^{3\pm}$) in terms of $Fe_2O_3$]) is 0% or more and 25% or less, preferably 0 to 22%, more preferably 0 to 20%, and most preferably 0 to 18%.

In the glass (A) of the present invention, since the redox falls within the above range and thus the redox is extremely lowered, in the case where it is used as a light guide plate part of an edge light type liquid crystal television, light absorption inside the glass in the visible light region (wavelength: 380 to 780 mm) does not become a problem.

In the glass (B) of the present invention, the bubble disappearance-starting temperature (TD) becomes 1485° C. or lower when the value of D in the following expression (1) is 0 or more.

$$D = 4 \times DF - (DE + 4 \times DR) \quad (1)$$
$$= 4 \times [SiO_2] + 8 \times [Al_2O_3] + 2 \times$$
$$= [MgO] - 1 \times [CaO] - 2 \times [SrO] -$$
$$= 2 \times [BaO] - 8 \times [Na_2O] - 12 \times [K_2O] - 180$$

In the expression (1), definitions of individual symbols are as follows.

DF represents contribution of the amount of glass formers and is as follows:

$$DF = 1 \times ([SiO_2] - 45) + 2 \times [Al_2O_3].$$

Among the glass formers, the content of $B_2O_3$ has no influence on the bubble disappearance-starting temperature, so that it is not included in DF.

DE represents contribution of the amounts of alkaline earth metals and is as follows:

$$DE = -2 \times [MgO] + 1 \times [CaO] + 2 \times [SrO] + 2 \times [BaO].$$

DR represents contribution of the amounts of alkali metals and is as follows:

$$DR = +2 \times [Na_2O] + 3 \times [K_2O].$$

Among the alkali metals, the content of $Li_2O$ has no influence on the bubble disappearance-starting temperature, so that it is not included in DR.

[$SiO_2$]: content of $SiO_2$
[$Al_2O_3$]: content of $Al_2O_3$
[MgO]: content of MgO
[CaO]: content of CaO
[SrO]: content of SrO
[BaO]: content of BaO
[$Na_2O$]: content of $Na_2O$
[$K_2O$]: content of $K_2O$ All of the above-described contents are contents expressed by mass percentage based on oxides.

Since the glass (B) of the present invention has a bubble disappearance-starting temperature (TD) of 1485° C. or lower, the redox lowering of the glass can be achieved by keeping the temperature in melting glass raw materials low and thus the content of the divalent iron ($Fe^{2+}$) in the glass becomes low. A preferable range of the content of the divalent iron ($Fe^{2+}$) in the glass will be described later.

The glass (C) of the present invention has a high fining action at a low temperature when the compositional ranges of individual components satisfy the above. Therefore, even in the case where the glass is melted at a low temperature, the bubble density of the glass to be produced is low.

Specifically, the bubble density B in a glass body obtained by melting glass raw materials at a temperature of 1550° C., followed by forming into a sheet and then annealing, is 10 pieces/kg or less, preferably 5 pieces/kg or less, more preferably 1 piece/kg or less, and particularly preferably 0.5 piece/kg or less.

The bubble density B is defined as follows. The raw materials of individual components are formulated so as to be target composition and are melted at 1550° C. by using a platinum crucible. At the melting, 400 g of the raw materials are charged in three portions at intervals of 20 minutes and then are allowed to stand for 30 minutes. Subsequently, the glass melt is allowed to flow out and formed into a sheet, followed by annealing. The bubble density of the glass body obtained by this method is taken as the bubble density B (piece/kg).

The size of the bubble may be a size capable of being observed on an optical microscope, and typically, bubbles having a diameter of about 10 μm to 1 mm are counted. The particle size of the raw materials and the kind and amount of the fining agent may be suitably selected. The particle size of the raw materials is, for example, 1 to 1000 μm.

Examples of the kinds of the raw materials include silica sand, aluminum oxide, sodium carbonate, and the like. Examples of the fining agent include sulfate salts, tin oxide, nitrate salts, and the like. The amount of the fining agent is, for example, 0.1 to 0.5 mass %.

Similarly, the bubble density A (piece/kg) is defined as follows. The raw materials of individual components are formulated so as to be target composition and are melted at the temperature of 1350° C., by using a platinum crucible. At the melting, 400 g of the raw materials are charged in three portions at intervals of 20 minutes and then are allowed to stand for 30 minutes. Subsequently, the glass melt is allowed to flow out and formed into a sheet, followed by annealing. The bubble density of the glass body obtained by this method is taken as the bubble density A (piece/kg).

The particle size of the raw materials and the kind and amount of the fining agent may be suitably selected so that the bubble density A (piece/kg) is about $10^4$ pieces/kg. The size of the bubble may be a size capable of being observed on an optical microscope, and typically, bubbles having a diameter of about 10 μm to 1 mm are counted. The melting conditions for the bubble density A and the bubble density B are the same, except for the condition of temperature.

In the glass (C) of the present invention, the ratio (B/A) of the bubble density B to the bubble density A in a glass body obtained by melting glass raw materials at a temperature of 1350° C., followed by forming into a sheet and then annealing, is preferably $10^{-3}$ or less, more preferably $10^4$ or less and further preferably $5 \times 10^{-5}$ or less. When (B/A) is $10^{-3}$ or less, the bubble density of the glass to be produced becomes low even in the case where it is manufactured through melting at a low temperature for achieving the redox lowering.

In the glass (C) of the present invention, the redox lowering of the glass can be achieved by keeping the temperature in melting glass raw materials low and thus the content of the divalent iron ($Fe^{2+}$) in the glass becomes low. A preferable range of the content of the divalent iron ($Fe^{2+}$) in the glass will be described later.

In the glasses (A) to (C) of the present invention, the content of divalent iron ($Fe^{2+}$) in terms of $Fe_2O_3$ is preferably 0 to 50 ppm, more preferably 0 to 40 ppm, further preferably 0 to 30 ppm, and most preferably 0 to 25 ppm. When the content of divalent iron ($Fe^{2+}$) in terms of $Fe_2O_3$ falls within the above range, in the case where it is used as a light guide plate part of an edge light type liquid crystal television, light absorption inside the glass in the visible light region (wavelength: 380 to 780 nm) does not become a problem.

The glasses (A) to (C) of the present invention may contain the following components as arbitrarily components.

The glasses (A) to (C) of the present invention may contain $ZrO_2$ for improving heat resistance and surface hardness of the glass. However, from the viewpoints of maintenance of the devitrification properties and maintenance of the low density, it is preferably not contained.

The glasses (A) to (C) of the present invention may contain $SnO_2$ used as a fining agent. In this case, the content of total tin in terms of $SnO_2$ is preferably 0 to 1%, more preferably 0.5% or less, further preferably 0.2% or less, and particularly preferably 0.1% or less as expressed by mass percentage, and the glasses are further preferably substantially free from it.

The glasses (A) to (C) of the present invention may contain $SO_3$ used as a fining agent. In this case, the content of $SO_3$ is preferably more than 0% and 0.5% or less, more preferably 0.3% or less, further preferably 0.2% or less, and particularly preferably 0.1% or less as expressed by mass percentage.

The glasses (A) to (C) of the present invention may contain $Sb_2O_3$ or $As_2O_3$ used as an oxidizing agent and a fining agent. In this case, the content of $Sb_2O_3$ or $As_2O_3$ is preferably 0 to 0.5%, more preferably 0.2% or less and further preferably 0.1% or less as expressed by mass percentage, and the glasses are further preferably substantially free from it.

The glasses (A) to (C) of the present invention may contain $CeO_2$. $CeO_2$ has an effect of decreasing the redox and the light absorption inside the glass at the wavelength of 400 to 700 nm can be decreased.

However, in the case of containing $CeO_2$ in a large amount, since $CeO_2$ not only causes solarization but also functions as a component that absorbs visible light, relative to the total amount of the above-described glass composition, the content is preferably 500 ppm or less, more preferably 400 ppm or less, further preferably 300 ppm or less, particularly preferably 250 ppm or less, and most preferably 200 ppm or less.

In the case of adding it, in order to facilitate the suppression of unevenness in product properties at the production, particularly unevenness in color, it is preferable to add it always in an amount of 0.1 ppm or more. For the control in color, addition in an amount of 1.0 ppm or more is preferred and addition in an amount of 5.0 ppm or more is more preferred.

In the case where an effect of decreasing the redox is expected, it is preferably added in an amount the same as or more than the iron amount (ppm by mass) in terms of $Fe_2O_3$ contained in the glass, it is more preferably added in an amount 1.5 times or more the iron amount, it is further preferably added in an amount 3 times or more the iron amount, and it is particularly preferably added in an amount 5 times or more the iron amount.

The glasses (A) to (C) of the present invention are preferably substantially free from $TiO_2$, CoO, $V_2O_5$, MnO, and the like that are coloring components. When they are substantially free from $TiO_2$, CoO, $V_2O_5$, MnO, and the like, a decrease in visible light transmittance is suppressed. The content of the components that function as such coloring components is preferably controlled to 0 to 0.05% as expressed by mass percentage, more preferably controlled to 0 to 0.02%, further preferably controlled to 0 to 0.01%, and most preferably controlled to less than 50 ppm.

The following will describe properties of the glasses (A) to (C) of the present invention.

In the glasses (A) to (C) of the present invention, temperature (T2) at which viscosity of a glass melt reaches $10^2$ dPa·s is preferably 1550° C. or lower since melting performance at a high temperature is satisfactory. In (A) to (C) of the present invention, the temperature T2 is more preferably 1500° C. or lower, further preferably 1490° C. or lower and particularly preferably 1480° C. or lower. The temperature T2 can be measured by using a rotary viscometer or the like.

In the glasses (A) to (C) of the present invention, a difference (Tc-T4) between devitrification temperature Tc and temperature (T4) at which viscosity of a glass melt reaches $10^4$ dPa·s is preferably 100° C. or lower since float forming ability is excellent. Tc-T4 is more preferably 50° C. or lower, further preferably 25° C. or lower and particularly preferably 0° C. or lower.

The devitrification temperature can be measured by observing the presence or absence of crystals on a microscope after a glass is held at a predetermined temperature for 2 hours. In addition, the temperature T4 can be measured by using a rotary viscometer or the like.

In the case of use of the present invention as a light guide plate of an edge light type liquid crystal television, the glass of the present invention is in the form of a glass sheet. The glass sheet to be used in the above use preferably has a length of at least one side of 200 mm or more and a thickness of 0.2 mm or more. The glass sheet to be used in the above use has a length of at least one side of more preferably 250 mm or more and further preferably 400 mm or more. The thickness is more preferably 1.5 mm or more, further preferably 2.0 mm or more and most preferably 2.1 mm or more.

In the case where the glasses (A) to (C) of the present invention are a glass sheet, the length of at least one side is 200 mm or more and the thickness is preferably 0.5 mm or more, more preferably 1.5 mm or more, further preferably 2.0 mm or more, and most preferably 2.1 mm or more.

In the case where the glasses (A) to (C) of the present invention are a glass sheet, glass raw materials formulated so as to be the compositional ratio in the glass sheet to be produced is melted to obtain a molten glass and subsequently the molten glass is formed by using any one forming method selected from the group consisting of a float process, a roll-out process, a pulling-up process, and a fusion process to obtain the glass sheet.

In this procedure, when maximum melting temperature in melting glass raw materials is controlled to the range of the bubble disappearance-starting temperature (TD) of the glass to TD+150° C., the redox lowering of the glass can be achieved. As a result, the inner transmittance of the produced glass sheet in the visible light region (wavelength: 380 to 780 nm) becomes high as mentioned later. The maximum melting temperature in melting glass raw materials is more preferably in the range of TD to TD+100° C.

In the glass sheet obtained by the above procedure, it is preferable that a minimum value of the inner transmittance in the wavelength range of 400 to 700 nm under a condition of light path length of 200 mm is 80% or more and a difference between the maximum value and the minimum value of the inner transmittance is 15% or less. It is more preferable that the minimum value of the above inner transmittance is 85% or more and a difference between the maximum value and the minimum value of the inner transmittance is 13% or less and it is further preferable that the minimum value of the above inner transmittance is 90% or more and a difference between the maximum value and the minimum value of the inner transmittance is 8% or less.

The glass sheet of the present invention can be subjected to a chemical strengthening treatment. Durability of the glass sheet against cracking and chipping is improved by performing the chemical strengthening treatment and hence it is preferable.

EXAMPLES

In the following, Examples 1 to 34 and 39 to 69 are Working Examples and Examples 35 to 38 are Comparative Examples. Raw materials of individual components were formulated so as to be a target composition and were melted at 1550° C. by using a platinum crucible. At the melting, 400 g of the raw materials were charged in three portions at intervals of 20 minutes and then were allowed to stand for 30 minutes. Subsequently, the glass melt was allowed to flow out and formed into a sheet, followed by annealing. The bubble density of the glass body obtained was taken as the bubble density B (piece/kg).

Raw materials of individual components were formulated so as to be target composition and were melted at 1350° C. by using a platinum crucible. At the melting, 400 g of the raw materials were charged in three portions at intervals of 20 minutes and then were allowed to stand for 30 minutes. Subsequently, the glass melt was allowed to flow out and formed into a sheet, followed by annealing. The bubble density of the glass body obtained was taken as the bubble density A (piece/kg). The melting conditions for the bubble density A and the bubble density B were the same, except for the condition of temperature.

Tables 1 to 14 show the glass composition (unit: mass %), the content of total iron oxide (t-$Fe_2O_3$) in terms of $Fe_2O_3$ (unit: ppm) as the content of iron in the glass, the content of divalent iron ($Fe^{2+}$) in terms of $Fe_2O_3$ (unit: ppm), the redox (Fe-redox) (($Fe^{2+}$)/($Fe^{2+}+Fe^{3+}$)) (unit: %), the temperature (T2) at which viscosity of a glass melt reaches $10^2$ dPa·s (unit: ° C.), the temperature (T4) at which viscosity of a glass melt reaches $10^4$ dPa·s (unit: ° C.), the devitrification temperature Tc (unit: ° C.), and the bubble disappearance-starting temperature (TD) (unit: ° C.) and the value of D (D).

For Examples 1 to 68, the bubble densities A and B (unit: piece/kg) defined in the above are shown. For Examples 1 to 5, 9 and 39 to 45, a minimum value (min, %), a maximum value (max, %) and a difference between the maximum value and the minimum value (delta, %) of inner transmittance (T_inner) in the wavelength range of 400 to 700 nm in the case of light path length of 200 mm are shown for the glass bodies (glass sheets) obtained in the above procedure.

TABLE 1

| | Mass % | | | | |
|---|---|---|---|---|---|
| | Example 1 | Example 2 | Example 3 | Example 4 | Example 5 |
| $SiO_2$ | 69.9 | 69.7 | 69.7 | 70.6 | 70.3 |
| $Al_2O_3$ | 3.0 | 3.0 | 3.0 | 3.0 | 3.0 |
| $Na_2O$ | 9.8 | 11.0 | 11.0 | 9.2 | 10.1 |
| $K_2O$ | 1.9 | 0.0 | 0.0 | 0.0 | 0.0 |
| CaO | 9.0 | 10.0 | 8.0 | 8.1 | 8.1 |
| MgO | 0.0 | 0.0 | 0.0 | 0.0 | 0.0 |
| SrO | 2.5 | 2.4 | 3.2 | 4.1 | 4.0 |
| BaO | 3.6 | 3.6 | 4.8 | 4.1 | 4.0 |
| $ZrO_2$ | 0.0 | 0.0 | 0.0 | 0.0 | 0.0 |
| $B_2O_3$ | 0.0 | 0.0 | 0.0 | 0.0 | 0.0 |
| $Li_2O$ | 0.0 | 0.0 | 0.0 | 1.0 | 0.5 |
| Total | 99.7 | 99.7 | 99.7 | 100.0 | 100.0 |
| $Sb_2O_3$ (ppm) | | | | | |
| $CeO_2$ (ppm) | | | | | |
| t-$Fe_2O_3$ (ppm) | 30 | 30 | 30 | 50 | 50 |
| Fe-redox (%) | 23 | 21 | 21 | 15 | 18 |
| $Fe^{2+}$ (as $Fe_2O_3$) (ppm) | 7 | 6 | 6 | 8 | 9 |
| $Li_2O$ + $Na_2O$ + $K_2O$ | 11.8 | 11.0 | 11.0 | 10.1 | 10.6 |
| MgO + CaO + SrO + BaO | 15.1 | 16.0 | 16.0 | 16.2 | 16.1 |
| T2 (° C.) | | | | | |
| T4 (° C.) | | | | | |
| Tc (° C.) | | | | | |
| Tc − T4 (° C.) | | | | | |

TABLE 1-continued

| | Mass % | | | | |
|---|---|---|---|---|---|
| | Example 1 | Example 2 | Example 3 | Example 4 | Example 5 |
| TD (° C.) | 1485 | 1466 | 1470 | 1436 | 1453 |
| D | 0.6 | 12.8 | 10.8 | 29.1 | 20.1 |
| Bubble density A (piece/kg) | more than $10^4$ | more than $10^4$ | more than $10^4$ | more than $10^4$ | more than $10^4$ |
| Bubble density B (piece/kg) | 1 or less | less than 0.5 | less than 0.5 | less than 0.5 | less than 0.5 |
| Bubble density B/A | less than $1 \times 10^{-4}$ | less than $5 \times 10^{-5}$ | less than $5 \times 10^{-5}$ | less than $5 \times 10^{-5}$ | less than $5 \times 10^{-5}$ |
| T_inner @200 mm | | | | | |
| min (%) | 88 | 88 | 88 | 84 | 83 |
| max (%) | 99 | 99 | 99 | 98 | 98 |
| delta (%) | 11 | 11 | 11 | 14 | 15 |

TABLE 2

| | Mass % | | | | |
|---|---|---|---|---|---|
| | Example 6 | Example 7 | Example 8 | Example 9 | Example 10 |
| $SiO_2$ | 69.7 | 70.0 | 69.7 | 69.7 | 71.7 |
| $Al_2O_3$ | 3.0 | 4.0 | 3.0 | 3.0 | 1.0 |
| $Na_2O$ | 11.0 | 11.0 | 11.0 | 11.0 | 11.0 |
| $K_2O$ | 0.0 | 0.0 | 0.0 | 0.0 | 0.0 |
| CaO | 8.0 | 11.0 | 12.0 | 8.0 | 8.0 |
| MgO | 0.0 | 0.0 | 0.0 | 0.0 | 0.0 |
| SrO | 4.0 | 2.0 | 4.0 | 4.0 | 2.0 |
| BaO | 2.0 | 0.0 | 0.0 | 4.0 | 6.0 |
| $ZrO_2$ | 0.0 | 0.0 | 0.0 | 0.0 | 0.0 |
| $B_2O_3$ | 2.0 | 2.0 | 0.0 | 0.0 | 0.0 |
| $Li_2O$ | 0.0 | 0.0 | 0.0 | 0.0 | 0.0 |
| Total | 99.7 | 100.0 | 99.7 | 99.7 | 99.7 |
| $Sb_2O_3$ (ppm) | | | | | |
| $CeO_2$ (ppm) | | | | | |
| t-$Fe_2O_3$ (ppm) | 100 | 100 | 100 | 30 | 100 |
| Fe-redox (%) | 20 | 19 | 20 | 21 | 22 |
| $Fe^{2+}$ (as $Fe_2O_3$) (ppm) | 20 | 19 | 20 | 6 | 22 |
| $Li_2O$ + $Na_2O$ + $K_2O$ | 11.0 | 11.0 | 11.0 | 11.0 | 11.0 |
| MgO + CaO + SrO + BaO | 14.0 | 13.0 | 16.0 | 16.0 | 16.0 |
| T2 (° C.) | 1454 | 1459 | 1437 | 1462 | 1447 |
| T4 (° C.) | 1031 | 1043 | 1039 | 1041 | 1026 |
| Tc (° C.) | | 1000 | 1120 | 1020 | >1078 |
| Tc − T4 (° C.) | | −43 | 81 | −21 | >52 |
| TD (° C.) | 1463 | 1437 | 1464 | 1455 | 1483 |
| D | 14.8 | 29.0 | 14.8 | 10.8 | 2.8 |
| Bubble density A (piece/kg) | more than $10^4$ | more than $10^4$ | more than $10^4$ | more than $10^4$ | more than $10^4$ |
| Bubble density B (piece/kg) | less than 0.5 | less than 0.5 | less than 0.5 | less than 0.1 | 1 or less |

TABLE 2-continued

| | Mass % | | | | |
|---|---|---|---|---|---|
| | Example 6 | Example 7 | Example 8 | Example 9 | Example 10 |
| Bubble density B/A | less than $5 \times 10^{-5}$ | less than $5 \times 10^{-5}$ | less than $5 \times 10^{-5}$ | less than $1 \times 10^{-5}$ | less than $1 \times 10^{-4}$ |
| T_inner @200 mm | | | | | |
| min | | | | 88 | |
| max | | | | 99 | |
| delta | | | | 11 | |

TABLE 3

| | Mass % | | | | |
|---|---|---|---|---|---|
| | Example 11 | Example 12 | Example 13 | Example 14 | Example 15 |
| $SiO_2$ | 71.8 | 71.8 | 71.8 | 71.8 | 71.8 |
| $Al_2O_3$ | 1.0 | 1.0 | 1.0 | 1.0 | 1.0 |
| $Na_2O$ | 10.9 | 10.9 | 10.9 | 10.9 | 10.9 |
| $K_2O$ | 0.0 | 0.0 | 0.0 | 0.0 | 0.0 |
| CaO | 8.0 | 8.0 | 10.0 | 0.0 | 12.0 |
| MgO | 0.0 | 0.0 | 0.0 | 12.0 | 0.0 |
| SrO | 0.0 | 6.0 | 6.0 | 4.0 | 4.0 |
| BaO | 8.0 | 2.0 | 0.0 | 0.0 | 0.0 |
| $ZrO_2$ | 0.0 | 0.0 | 0.0 | 0.0 | 0.0 |
| $B_2O_3$ | 0.0 | 0.0 | 0.0 | 0.0 | 0.0 |
| $Li_2O$ | 0.0 | 0.0 | 0.0 | 0.0 | 0.0 |
| Total | 99.7 | 99.7 | 99.7 | 99.7 | 99.7 |
| $Sb_2O_3$ (ppm) | | | | | |
| $CeO_2$ (ppm) | | | | | |
| t-$Fe_2O_3$ (ppm) | 100 | 100 | 100 | 150 | 200 |
| Fe-redox (%) | 23 | 23 | 23 | 19 | 22 |
| $Fe^{2+}$ (as $Fe_2O_3$) (ppm) | 23 | 23 | 23 | 29 | 44 |
| $Li_2O$ + $Na_2O$ + $K_2O$ | 10.9 | 10.9 | 10.9 | 10.9 | 10.9 |
| MgO + CaO + SrO + BaO | 16.0 | 16.0 | 16.0 | 16.0 | 16.0 |
| T2 (° C.) | 1452 | 1443 | 1431 | 1459 | 1421 |
| T4 (° C.) | 1027 | 1029 | 1028 | 1065 | 1027 |
| Tc (° C.) | >1078 | >1057 | >1057 | | 1110 |
| Tc − T4 (° C.) | >51 | >28 | >29 | | 83 |
| TD (° C.) | 1481 | 1482 | 1478 | 1412 | 1475 |
| D | 4.0 | 4.0 | 6.0 | 44.0 | 8.0 |
| Bubble density A (piece/kg) | more than $10^4$ | more than $10^4$ | more than $10^4$ | more than $10^4$ | more than $10^4$ |
| Bubble density B (piece/kg) | less than 0.5 | less than 0.5 | less than 0.5 | less than 0.5 | less than 0.5 |
| Bubble density B/A | less than $5 \times 10^{-5}$ | less than $5 \times 10^{-5}$ | less than $5 \times 10^{-5}$ | less than $5 \times 10^{-5}$ | less than $5 \times 10^{-5}$ |
| T_inner @200 mm | | | | | |
| min | | | | | |
| max | | | | | |
| delta | | | | | |

TABLE 4

| | Mass % | | | | |
|---|---|---|---|---|---|
| | Example 16 | Example 17 | Example 18 | Example 19 | Example 20 |
| SiO$_2$ | 70.2 | 70.1 | 60.0 | 74.9 | 54.6 |
| Al$_2$O$_3$ | 3.0 | 1.0 | 10.0 | 1.8 | 10.0 |
| Na$_2$O | 12.5 | 11.5 | 11.4 | 5.0 | 8.4 |
| K$_2$O | 0.0 | 0.0 | 0.0 | 0.0 | 0.0 |
| CaO | 10.0 | 8.5 | 5.0 | 15.0 | 14.1 |
| MgO | 0.0 | 3.0 | 0.0 | 0.0 | 0.0 |
| SrO | 4.0 | 3.6 | 13.6 | 3.3 | 12.9 |
| BaO | 0.0 | 2.0 | 0.0 | 0.0 | 0.0 |
| ZrO$_2$ | 0.0 | 0.0 | 0.0 | 0.0 | 0.0 |
| B$_2$O$_3$ | 0.0 | 0.0 | 0.0 | 0.0 | 0.0 |
| Li$_2$O | 0.0 | 0.0 | 0.0 | 0.0 | 0.0 |
| Total | 99.7 | 99.7 | 100.0 | 100.0 | 100.0 |
| Sb$_2$O$_3$ (ppm) | | | | | |
| CeO$_2$ (ppm) | | | | | |
| t-Fe$_2$O$_3$ (ppm) | 200 | 200 | 100 | 100 | 100 |
| Fe-redox (%) | 22 | 23 | 20 | 15 | 15 |
| Fe$^{2+}$ (as Fe$_2$O$_3$) (ppm) | 44 | 46 | 20 | 15 | 15 |
| Li$_2$O + Na$_2$O + K$_2$O | 12.5 | 11.5 | 11.4 | 5.0 | 8.4 |
| MgO + CaO + SrO + BaO | 14.0 | 17.1 | 18.6 | 18.3 | 27.0 |
| T2 (° C.) | 1442 | 1415 | 1445 | 1596 | 1316 |
| T4 (° C.) | 1031 | 1022 | 1197 | | 1138 |
| Tc (° C.) | 1035 | 1000 | | | |
| Tc − T4 (° C.) | 4 | −22 | | | |
| TD (° C.) | 1477 | 1485 | 1464 | 1357 | 1478 |
| D | 6.8 | 2.7 | 16.6 | 72.4 | 11.3 |
| Bubble density A (piece/kg) | more than 10$^4$ | more than 10$^4$ | more than 10$^4$ | more than 10$^4$ | more than 10$^4$ |
| Bubble density B (piece/kg) | 1 or less | 1 or less | 1 or less | 1 or less | 1 or less |
| Bubble density B/A | less than 1 × 10$^{-4}$ | less than 1 × 10$^{-4}$ | less than 1 × 10$^{-4}$ | less than 1 × 10$^{-4}$ | less than 1 × 10$^{-4}$ |
| T_inner @200 mm min | | | | | |
| max | | | | | |
| delta | | | | | |

TABLE 5

| | Mass % | | | | |
|---|---|---|---|---|---|
| | Example 21 | Example 22 | Example 23 | Example 24 | Example 25 |
| SiO$_2$ | 58.1 | 53.7 | 71.0 | 67.1 | 59.1 |
| Al$_2$O$_3$ | 10.0 | 10.0 | 1.0 | 1.0 | 8.9 |
| Na$_2$O | 12.5 | 9.3 | 9.0 | 5.0 | 5.0 |
| K$_2$O | 0.0 | 0.0 | 0.0 | 0.0 | 0.0 |
| CaO | 10.2 | 14.0 | 9.8 | 6.4 | 5.7 |
| MgO | 9.2 | 0.0 | 5.9 | 15.0 | 0.8 |
| SrO | 0.0 | 3.0 | 1.6 | 2.3 | 15.0 |
| BaO | 0.0 | 10.0 | 1.7 | 3.2 | 5.5 |
| ZrO$_2$ | 0.0 | 0.0 | 0.0 | 0.0 | 0.0 |
| B$_2$O$_3$ | 0.0 | 0.0 | 0.0 | 0.0 | 0.0 |
| Li$_2$O | 0.0 | 0.0 | 0.0 | 0.0 | 0.0 |
| Total | 100.0 | 100.0 | 100.0 | 100.0 | 100.0 |
| Sb$_2$O$_3$ (ppm) | | | | | |
| CeO$_2$ (ppm) | | | | | |
| t-Fe$_2$O$_3$ (ppm) | 100 | 100 | 100 | 100 | 100 |
| Fe-redox (%) | 20 | 15 | 14 | 18 | 16 |
| Fe$^{2+}$ (as Fe$_2$O$_3$) (ppm) | 20 | 15 | 14 | 18 | 16 |
| Li$_2$O + Na$_2$O + K$_2$O | 12.5 | 9.3 | 9.0 | 5.0 | 5.0 |
| MgO + CaO + SrO + BaO | 19.4 | 27.0 | 19.0 | 26.9 | 27.0 |
| T2 (° C.) | 1448 | 1394 | 1495 | 1442 | 1447 |
| T4 (° C.) | 1211 | 1227 | 1212 | 1214 | 1245 |
| Tc (° C.) | | | | | |
| Tc − T4 (° C.) | | | | | |
| TD (° C.) | 1425 | 1485 | 1427 | 1372 | 1419 |
| D | 40.6 | 0.4 | 35.4 | 69.0 | 42.5 |
| Bubble density A (piece/kg) | more than 10$^4$ | more than 10$^4$ | more than 10$^4$ | more than 10$^4$ | more than 10$^4$ |
| Bubble density B (piece/kg) | 1 or less | 1 or less | 1 or less | 1 or less | 1 or less |
| Bubble density B/A | less than 1 × 10$^{-4}$ | less than 1 × 10$^{-4}$ | less than 1 × 10$^{-4}$ | less than 1 × 10$^{-4}$ | less than 1 × 10$^{-4}$ |
| T_inner @200 mm min | | | | | |
| max | | | | | |
| delta | | | | | |

TABLE 6

| | Mass % | | | | |
|---|---|---|---|---|---|
| | Example 26 | Example 27 | Example 28 | Example 29 | Example 30 |
| SiO$_2$ | 58.8 | 61.0 | 59.1 | 71.3 | 60.0 |
| Al$_2$O$_3$ | 10.0 | 4.7 | 10.0 | 3.2 | 7.0 |
| Na$_2$O | 5.0 | 8.2 | 7.6 | 12.0 | 5.0 |
| K$_2$O | 0.0 | 0.0 | 0.0 | 0.5 | 1.0 |
| CaO | 15.0 | 11.0 | 5.0 | 5.7 | 0.0 |
| MgO | 10.2 | 6.8 | 13.7 | 0.0 | 0.0 |
| SrO | 0.0 | 0.0 | 0.0 | 1.5 | 12.0 |
| BaO | 1.0 | 8.3 | 4.6 | 5.8 | 15.0 |
| ZrO$_2$ | 0.0 | 0.0 | 0.0 | 0.0 | 0.0 |
| B$_2$O$_3$ | 0.0 | 0.0 | 0.0 | 0.0 | 0.0 |
| Li$_2$O | 0.0 | 0.0 | 0.0 | 0.0 | 0.0 |
| Total | 100.0 | 100.0 | 100.0 | 100.0 | 100.0 |
| Sb$_2$O$_3$ (ppm) | | | | | |
| CeO$_2$ (ppm) | | | | | |
| t-Fe$_2$O$_3$ (ppm) | 100 | 100 | 100 | 100 | 100 |
| Fe-redox (%) | 25 | 25 | 20 | 15 | 15 |
| Fe$^{2+}$ (as Fe$_2$O$_3$) (ppm) | 25 | 25 | 20 | 15 | 15 |
| Li$_2$O + Na$_2$O + K$_2$O | 5.0 | 8.2 | 7.6 | 12.5 | 6.0 |
| MgO + CaO + SrO + BaO | 26.2 | 26.1 | 23.3 | 13.0 | 27.0 |

TABLE 6-continued

|  | Mass % | | | | |
|---|---|---|---|---|---|
|  | Example 26 | Example 27 | Example 28 | Example 29 | Example 30 |
| T2 (° C.) | 1496 | 1422 | 1536 | 1588 | 1498 |
| T4 (° C.) | 1278 | 1223 | 1308 | 1273 | 1304 |
| Tc (° C.) | | | | | |
| Tc − T4 (° C.) | | | | | |
| TD (° C.) | 1322 | 1458 | 1338 | 1472 | 1473 |
| D | 98.6 | 22.0 | 88.8 | 8.5 | 10.0 |
| Bubble density A (piece/kg) | more than $10^4$ | more than $10^4$ | more than $10^4$ | more than $10^4$ | more than $10^4$ |
| Bubble density B (piece/kg) | 1 or less | 1 or less | 1 | 1 | 1 |
| Bubble density B/A | less than $1 \times 10^{-4}$ | less than $1 \times 10^{-4}$ | less than $1 \times 10^{-4}$ | less than $1 \times 10^{-4}$ | less than $1 \times 10^{-4}$ |
| T_inner @200 mm min | | | | | |
| max | | | | | |
| delta | | | | | |

TABLE 7

|  | Mass % | | | | |
|---|---|---|---|---|---|
|  | Example 31 | Example 32 | Example 33 | Example 34 | Example 35 |
| $SiO_2$ | 62.7 | 64.9 | 69.5 | 57.2 | 57.5 |
| $Al_2O_3$ | 6.4 | 5.1 | 1.0 | 5.4 | 7.4 |
| $Na_2O$ | 5.0 | 5.0 | 5.0 | 10.3 | 4.8 |
| $K_2O$ | 3.5 | 3.6 | 4.5 | 0.1 | 4.3 |
| CaO | 9.7 | 9.6 | 5.0 | 5.0 | 3.3 |
| MgO | 4.6 | 5.8 | 15.0 | 11.3 | 4.0 |
| SrO | 6.0 | 0.0 | 0.0 | 10.7 | 13.8 |
| BaO | 2.1 | 6.0 | 0.0 | 0.0 | 4.8 |
| $ZrO_2$ | 0.0 | 0.0 | 0.0 | 0.0 | 0.2 |
| $B_2O_3$ | 0.0 | 0.0 | 0.0 | 0.0 | 0.0 |
| $Li_2O$ | 0.0 | 0.0 | 0.0 | 0.0 | 0.0 |
| Total | 100.0 | 100.0 | 100.0 | 100.0 | 100.1 |
| $Sb_2O_3$ (ppm) | | | | | |
| $CeO_2$ (ppm) | | | | | |
| t-$Fe_2O_3$ (ppm) | 100 | 100 | 100 | 100 | 5000 |
| Fe-redox (%) | 24 | 15 | 25 | 14 | 29 |
| $Fe^{2+}$ (as $Fe_2O_3$) (ppm) | 24 | 15 | 25 | 14 | 1450 |
| $Li_2O$ + $Na_2O$ + $K_2O$ | 8.5 | 8.6 | 9.5 | 10.4 | 9.1 |
| MgO + CaO + SrO + BaO | 22.4 | 21.4 | 20.0 | 27.0 | 25.9 |
| T2 (° C.) | 1484 | 1547 | 1514 | 1265 | 1486 |
| T4 (° C.) | 1244 | 1294 | 1237 | 1089 | 1070 |
| Tc (° C.) | | | | | |
| Tc − T4 (° C.) | | | | | |
| TD (° C.) | 1447 | 1439 | 1419 | 1484 | 1513 |
| D | 23.3 | 27.2 | 37.0 | 4.6 | −13.3 |
| Bubble density A (piece/kg) | more than $10^4$ | more than $10^4$ | more than $10^4$ | more than $10^4$ | more than $10^4$ |
| Bubble density B (piece/kg) | 1 | 1 | 1 | 1 | 100 or more |
| Bubble density B/A | less than | less than | less than | less than | more than |

TABLE 7-continued

|  | Mass % | | | | |
|---|---|---|---|---|---|
|  | Example 31 | Example 32 | Example 33 | Example 34 | Example 35 |
| B/A | $1 \times 10^{-4}$ | $1 \times 10^{-4}$ | $1 \times 10^{-4}$ | $1 \times 10^{-4}$ | $1 \times 10^{-2}$ |
| T_inner @200 mm | | | | | |
| min | | | | | |
| max | | | | | |
| delta | | | | | |

TABLE 8

|  | Mass % | | | | |
|---|---|---|---|---|---|
|  | Example 36 | Example 37 | Example 38 | Example 39 | Example 40 |
| $SiO_2$ | 64.0 | 60.2 | 69.5 | 69.7 | 69.7 |
| $Al_2O_3$ | 5.0 | 8.0 | 0.9 | 3.0 | 3.0 |
| $Na_2O$ | 10.0 | 6.0 | 13.4 | 11.0 | 11.0 |
| $K_2O$ | 1.0 | 4.0 | 0.3 | 0.0 | 0.0 |
| CaO | 9.0 | 10.0 | 8.6 | 8.0 | 8.0 |
| MgO | 0.0 | 0.0 | 6.3 | 0.0 | 0.0 |
| SrO | 5.0 | 3.0 | 0.0 | 4.0 | 4.0 |
| BaO | 4.0 | 6.6 | 0.0 | 4.0 | 4.0 |
| $ZrO_2$ | 1.8 | 2.0 | 0.0 | 0.0 | 0.0 |
| $B_2O_3$ | 0.0 | 0.0 | 0.0 | 0.0 | 0.0 |
| $Li_2O$ | 0.0 | 0.0 | 0.0 | 0.0 | 0.0 |
| Total | 99.8 | 99.8 | 99.7 | 99.7 | 99.7 |
| $Sb_2O_3$ (ppm) | | | | | |
| $CeO_2$ (ppm) | | | | 150 | 250 |
| t-$Fe_2O_3$ (ppm) | 5000 | 5000 | 400 | 25 | 30 |
| Fe-redox (%) | 28 | 27 | 35 | 10 | 2 |
| $Fe^{2+}$ (as $Fe_2O_3$) (ppm) | 1400 | 1350 | 140 | 2.5 | 0.5 |
| $Li_2O$ + $Na_2O$ + $K_2O$ | 11.0 | 10.0 | 13.7 | 11.0 | 11.0 |
| MgO + CaO + SrO + BaO | 18.0 | 19.6 | 14.9 | 16.0 | 16.0 |
| T2 (° C.) | 1430 | 1503 | 1440 | 1462 | 1462 |
| T4 (° C.) | 1092 | 1169 | 1030 | 1041 | 1041 |
| Tc (° C.) | | | 1020 | 1020 | 1020 |
| Tc − T4 (° C.) | | | 10 | −21 | −21 |
| TD (° C.) | 1506 | 1488 | 1494 | 1455 | 1455 |
| D | −3.0 | −0.4 | −1.6 | 10.8 | 10.8 |
| Bubble density A (piece/kg) | more than $10^4$ | more than $10^4$ | more than $10^4$ | more than $10^4$ | more than $10^4$ |
| Bubble density B (piece/kg) | more than 10 | more than 10 | 18 | 1 or less | 1 or less |
| Bubble density B/A | more than $1 \times 10^{-3}$ | more than $1 \times 10^{-3}$ | $1.8 \times 10^{-3}$ | less than $1 \times 10^{-4}$ | less than $1 \times 10^{-4}$ |
| T_inner @200 mm | | | | | |
| min | | | | 97 | 95 |
| max | | | | 99 | 99 |
| delta | | | | 2 | 4 |

TABLE 9

| | Mass % | | | | |
|---|---|---|---|---|---|
| | Example 41 | Example 42 | Example 43 | Example 44 | Example 45 |
| $SiO_2$ | 69.7 | 69.7 | 69.7 | 69.7 | 69.7 |
| $Al_2O_3$ | 3.6 | 4.3 | 4.6 | 4.9 | 5.3 |
| $Na_2O$ | 11.1 | 11.1 | 11.1 | 11.1 | 11.1 |
| $K_2O$ | 0.0 | 0.0 | 0.0 | 0.0 | 0.0 |
| CaO | 8.0 | 8.0 | 8.0 | 8.0 | 8.0 |
| MgO | 0.0 | 0.0 | 0.0 | 0.0 | 0.0 |
| SrO | 3.4 | 2.7 | 2.4 | 2.1 | 1.7 |
| BaO | 4.0 | 4.0 | 4.0 | 4.0 | 4.0 |
| $ZrO_2$ | 0.0 | 0.0 | 0.0 | 0.0 | 0.0 |
| $B_2O_3$ | 0.0 | 0.0 | 0.0 | 0.0 | 0.0 |
| $Li_2O$ | 0.0 | 0.0 | 0.0 | 0.0 | 0.0 |
| Total | 99.8 | 99.8 | 99.8 | 99.8 | 99.8 |
| $Sb_2O_3$ (ppm) | | | | | |
| $CeO_2$ (ppm) | 250 | 200 | 175 | 100 | 75 |
| t-$Fe_2O_3$ (ppm) | 25 | 25 | 25 | 25 | 25 |
| Fe-redox (%) | 1 | 4 | 8 | 14 | 16 |
| $Fe^{2+}$ (as $Fe_2O_3$) (ppm) | 0.25 | 1 | 2 | 3.5 | 4 |
| $Li_2O$ + $Na_2O$ + $K_2O$ | 11.1 | 11.1 | 11.1 | 11.1 | 11.1 |
| MgO + CaO + SrO + BaO | 15.4 | 14.7 | 14.4 | 14.1 | 13.7 |
| T2 (° C.) | 1488 | 1506 | 1514 | 1521 | 1530 |
| T4 (° C.) | 1061 | 1072 | 1077 | 1083 | 1089 |
| Tc (° C.) | 1017 | 1018 | 1017 | 1020 | 1024 |
| Tc − T4 (° C.) | −44 | −54 | −60 | −63 | −65 |
| TD (° C.) | 1430 | 1417 | 1413 | 1407 | 1400 |
| D | 16 | 23 | 26 | 29 | 33 |
| Bubble density A (piece/kg) | more than $10^4$ | more than $10^4$ | more than $10^4$ | more than $10^4$ | more than $10^4$ |
| Bubble density B (piece/kg) | 1 or less | 1 or less | 1 or less | 1 or less | 1 |
| Bubble density B/A | less than $1 \times 10^{-4}$ | less than $1 \times 10^{-4}$ | less than $1 \times 10^{-4}$ | less than $1 \times 10^{-4}$ | less than $1 \times 10^{-4}$ |
| T_inner @200 mm | | | | | |
| min | 94 | 96 | 94 | 92 | 90 |
| max | 99 | 99 | 99 | 99 | 99 |
| delta | 5 | 3 | 5 | 7 | 9 |

TABLE 10

| | Mass % | | | | |
|---|---|---|---|---|---|
| | Example 46 | Example 47 | Example 48 | Example 49 | Example 50 |
| $SiO_2$ | 69.8 | 70.5 | 70.5 | 70.5 | 70.5 |
| $Al_2O_3$ | 7.0 | 3.7 | 4.3 | 4.7 | 5.0 |
| $Na_2O$ | 11.0 | 11.1 | 11.2 | 11.1 | 11.1 |
| $K_2O$ | 0.0 | 0.0 | 0.0 | 0.0 | 0.0 |
| CaO | 8.0 | 4.1 | 4.1 | 4.1 | 4.1 |
| MgO | 0.0 | 2.9 | 2.9 | 2.9 | 2.9 |
| SrO | 0.0 | 3.4 | 2.7 | 2.4 | 2.1 |
| BaO | 4.0 | 4.1 | 4.1 | 4.1 | 4.1 |
| $ZrO_2$ | 0.0 | 0.0 | 0.0 | 0.0 | 0.0 |
| $B_2O_3$ | 0.0 | 0.0 | 0.0 | 0.0 | 0.0 |
| $Li_2O$ | 0.0 | 0.0 | 0.0 | 0.0 | 0.0 |
| Total | 99.8 | 99.8 | 99.8 | 99.8 | 99.8 |
| $Sb_2O_3$ (ppm) | | 250 | 500 | 100 | 1000 |
| $CeO_2$ (ppm) | | | | | |
| t-$Fe_2O_3$ (ppm) | 24 | 25 | 25 | 25 | 25 |
| Fe-redox (%) | 23 | 14 | 12 | 18 | 10 |
| $Fe^{2+}$ (as $Fe_2O_3$) (ppm) | 5.5 | 3.5 | 3 | 4.5 | 2.5 |
| $Li_2O$ + $Na_2O$ + $K_2O$ | 11.0 | 11.1 | 11.2 | 11.1 | 11.1 |
| MgO + CaO + SrO + BaO | 12.0 | 14.5 | 13.8 | 13.5 | 13.2 |
| T2 (° C.) | 1585 | 1512 | 1534 | 1545 | 1556 |
| T4 (° C.) | 1128 | 1075 | 1091 | 1099 | 1107 |
| Tc (° C.) | | | | | |
| Tc − T4 (° C.) | | | | | |
| TD (° C.) | 1371 | 1409 | 1397 | 1391 | 1385 |
| D | 51.2 | 29.5 | 34.9 | 39.5 | 42.5 |
| Bubble density A (piece/kg) | more than $10^4$ | more than $10^4$ | more than $10^4$ | more than $10^4$ | more than $10^4$ |
| Bubble density B (piece/kg) | 1 | 1 or less | 1 or less | 1 or less | 1 |
| Bubble density B/A | less than $1 \times 10^{-4}$ | less than $1 \times 10^{-4}$ | less than $1 \times 10^{-4}$ | less than $1 \times 10^{-4}$ | less than $1 \times 10^{-4}$ |
| T_inner @200 mm | | | | | |
| min | | | | | |
| max | | | | | |
| delta | | | | | |

TABLE 11

| | Mass % | | | | |
|---|---|---|---|---|---|
| | Example 51 | Example 52 | Example 53 | Example 54 | Example 55 |
| $SiO_2$ | 68.9 | 69.5 | 69.8 | 68.5 | 69.1 |
| $Al_2O_3$ | 3.7 | 3.9 | 4.2 | 4.5 | 4.5 |
| $Na_2O$ | 10.0 | 10.4 | 11.4 | 9.2 | 10.8 |
| $K_2O$ | 0.0 | 0.0 | 0.0 | 0.0 | 0.0 |
| CaO | 7.9 | 8.0 | 8.0 | 7.9 | 7.9 |
| MgO | 0.0 | 0.0 | 0.0 | 0.0 | 0.0 |
| SrO | 4.6 | 4.0 | 3.2 | 3.9 | 2.3 |
| BaO | 4.7 | 4.0 | 3.2 | 5.8 | 5.2 |
| $ZrO_2$ | 0.0 | 0.0 | 0.0 | 0.0 | 0.0 |
| $B_2O_3$ | 0.0 | 0.0 | 0.0 | 0.0 | 0.0 |
| $Li_2O$ | 0.0 | 0.0 | 0.0 | 0.0 | 0.0 |
| Total | 99.8 | 99.8 | 99.8 | 99.8 | 99.8 |
| $Sb_2O_3$ (ppm) | | | | | |
| $CeO_2$ (ppm) | | | | | |
| t-$Fe_2O_3$ (ppm) | 12 | 10 | 15 | 13 | 16 |
| Fe-redox (%) | 21 | 20 | 20 | 19 | 22 |
| $Fe^{2+}$ (as $Fe_2O_3$) (ppm) | 2.5 | 2 | 3 | 2.5 | 3.5 |
| $Li_2O$ + $Na_2O$ + $K_2O$ | 10.0 | 10.4 | 11.4 | 9.2 | 10.8 |
| MgO + CaO + SrO + BaO | 17.2 | 16.0 | 14.4 | 17.6 | 15.4 |
| T2 (° C.) | 1501 | 1482 | 1508 | 1510 | 1515 |
| T4 (° C.) | 1076 | 1065 | 1073 | 1088 | 1080 |
| Tc (° C.) | | | 1020 | | 1019 |

TABLE 11-continued

| | Mass % | | | | |
|---|---|---|---|---|---|
| | Example 51 | Example 52 | Example 53 | Example 54 | Example 55 |
| Tc − T4 (° C.) | | | 53 | | −61 |
| TD (° C.) | 1423 | 1422 | 1418 | 1409 | 1413 |
| D | 18.7 | 22 | 20.8 | 29.1 | 23.1 |
| Bubble density A (piece/kg) | more than $10^4$ | more than $10^4$ | more than $10^4$ | more than $10^4$ | more than $10^4$ |
| Bubble density B (piece/kg) | 1 or less | 1 or less | 1 or less | 1 or less | 1 or less |
| Bubble density B/A | less than $1 \times 10^{-4}$ | less than $1 \times 10^{-4}$ | less than $1 \times 10^{-4}$ | less than $1 \times 10^{-4}$ | less than $1 \times 10^{-4}$ |
| T_inner @200 mm min | | | | | |
| max | | | | | |
| delta | | | | | |

TABLE 12

| | Mass % | | | | |
|---|---|---|---|---|---|
| | Example 56 | Example 57 | Example 58 | Example 59 | Example 60 |
| $SiO_2$ | 69.6 | 68.8 | 68.8 | 67.7 | 69.2 |
| $Al_2O_3$ | 4.6 | 4.8 | 4.8 | 4.8 | 4.9 |
| $Na_2O$ | 10.4 | 10.0 | 9.8 | 9.3 | 9.7 |
| $K_2O$ | 0.0 | 0.0 | 0.0 | 0.0 | 0.0 |
| CaO | 8.0 | 7.9 | 7.9 | 7.8 | 8.0 |
| MgO | 0.0 | 0.0 | 0.0 | 0.0 | 0.0 |
| SrO | 3.6 | 3.3 | 2.6 | 1.6 | 4.0 |
| BaO | 3.6 | 5.0 | 5.9 | 8.6 | 4.0 |
| $ZrO_2$ | 0.0 | 0.0 | 0.0 | 0.0 | 0.0 |
| $B_2O_3$ | 0.0 | 0.0 | 0.0 | 0.0 | 0.0 |
| $Li_2O$ | 0.0 | 0.0 | 0.0 | 0.0 | 0.0 |
| Total | 99.8 | 99.8 | 99.8 | 99.8 | 99.8 |
| $Sb_2O_3$ (ppm) | | | | | |
| $CeO_2$ (ppm) | | | | | |
| t-$Fe_2O_3$ (ppm) | 22 | 25 | 23 | 20 | 27 |
| Fe-redox (%) | 23 | 20 | 22 | 20 | 22 |
| $Fe^{2+}$ (as $Fe_2O_3$) (ppm) | 5 | 5 | 5 | 4 | 6 |
| $Li_2O$ + $Na_2O$ + $K_2O$ | 10.4 | 10.0 | 9.8 | 9.3 | 9.7 |
| MgO + CaO + SrO + BaO | 15.2 | 16.2 | 16.4 | 18.0 | 16.0 |
| T2 (° C.) | 1500 | 1529 | 1509 | 1534 | 1514 |
| T4 (° C.) | 1078 | 1093 | 1086 | 1098 | 1089 |
| Tc (° C.) | | | | | |
| Tc − T4 (° C.) | | | | | |
| TD (° C.) | 1409 | 1402 | 1406 | 1408 | 1402 |
| D | 29.6 | 29.1 | 30.3 | 26.6 | 34.4 |
| Bubble density A (piece/kg) | more than $10^4$ | more than $10^4$ | more than $10^4$ | more than $10^4$ | more than $10^4$ |
| Bubble density B (piece/kg) | 1 or less | 1 or less | 1 or less | 1 or less | 1 or less |
| Bubble density B/A | less than $1 \times 10^{-4}$ | less than $1 \times 10^{-4}$ | less than $1 \times 10^{-4}$ | less than $1 \times 10^{-4}$ | less than $1 \times 10^{-4}$ |
| T_inner @200 mm min | | | | | |
| max | | | | | |
| delta | | | | | |

TABLE 13

| | Mass % | | | | |
|---|---|---|---|---|---|
| | Example 61 | Example 62 | Example 63 | Example 64 | Example 65 |
| $SiO_2$ | 68.2 | 71.3 | 71.3 | 71.4 | 70.5 |
| $Al_2O_3$ | 4.9 | 3.7 | 4.4 | 5.5 | 5.4 |
| $Na_2O$ | 9.1 | 11.3 | 11.3 | 11.2 | 11.1 |
| $K_2O$ | 0.0 | 0.0 | 0.0 | 0.0 | 0.0 |
| CaO | 7.9 | 0.0 | 0.0 | 0.0 | 4.1 |
| MgO | 0.0 | 5.9 | 5.9 | 5.9 | 2.9 |
| SrO | 2.6 | 3.5 | 2.8 | 1.7 | 1.7 |
| BaO | 7.1 | 4.1 | 4.1 | 4.1 | 4.1 |
| $ZrO_2$ | 0.0 | 0.0 | 0.0 | 0.0 | 0.0 |
| $B_2O_3$ | 0.0 | 0.0 | 0.0 | 0.0 | 0.0 |
| $Li_2O$ | 0.0 | 0.0 | 0.0 | 0.0 | 0.0 |
| Total | 99.8 | 99.8 | 99.8 | 99.8 | 99.8 |
| $Sb_2O_3$ (ppm) | | | | | |
| $CeO_2$ (ppm) | | | | | |
| t-$Fe_2O_3$ (ppm) | 30 | 33 | 38 | 40 | 35 |
| Fe-redox (%) | 23 | 21 | 21 | 20 | 24 |
| $Fe^{2+}$ (as $Fe_2O_3$) (ppm) | 7 | 7 | 8 | 8 | 8.5 |
| $Li_2O$ + $Na_2O$ + $K_2O$ | 9.1 | 11.3 | 11.3 | 11.2 | 11.1 |
| MgO + CaO + SrO + BaO | 17.6 | 13.5 | 12.8 | 11.7 | 12.8 |
| T2 (° C.) | 1516 | 1542 | 1564 | 1600 | 1570 |
| T4 (° C.) | 1093 | 1094 | 1110 | 1136 | 1117 |
| Tc (° C.) | | | | | |
| Tc − T4 (° C.) | | | | | |
| TD (° C.) | 1405 | 1387 | 1375 | 1355 | 1378 |
| D | 31.9 | 41 | 48 | 60.2 | 46.5 |
| Bubble density A (piece/kg) | more than $10^4$ | more than $10^4$ | more than $10^4$ | more than $10^4$ | more than $10^4$ |
| Bubble density B (piece/kg) | 1 or less | 1 or less | 1 | 1 | 1 |
| Bubble density B/A | less than $1 \times 10^{-4}$ | less than $1 \times 10^{-4}$ | less than $1 \times 10^{-4}$ | less than $1 \times 10^{-4}$ | less than $1 \times 10^{-4}$ |
| T_inner @200 mm min | | | | | |
| max | | | | | |
| delta | | | | | |

TABLE 14

| | Mass % | | | |
|---|---|---|---|---|
| | Example 66 | Example 67 | Example 68 | Example 69 |
| SiO$_2$ | 69.4 | 71.0 | 60.8 | 64.7 |
| Al$_2$O$_3$ | 4.6 | 3.7 | 12.9 | 16.2 |
| Na$_2$O | 6.1 | 4.3 | 12.4 | 13.8 |
| K$_2$O | 4.4 | 6.0 | 6.0 | 0.0 |
| CaO | 8.0 | 0.0 | 0.1 | 0.0 |
| MgO | 0.0 | 5.9 | 6.6 | 5.1 |
| SrO | 2.4 | 3.4 | 0.0 | 0.0 |
| BaO | 4.0 | 4.1 | 0.0 | 0.0 |
| ZrO$_2$ | 0.0 | 0.0 | 1.0 | 0.0 |
| B$_2$O$_3$ | 0.0 | 0.0 | 0.0 | 0.0 |
| Li$_2$O | 0.9 | 1.4 | 0.0 | 0.0 |
| Total | 99.8 | 99.8 | 99.8 | 99.8 |
| Sb$_2$O$_3$ (ppm) | | | | |
| CeO$_2$ (ppm) | | | | |
| t-Fe$_2$O$_3$ (ppm) | 36 | 35 | 30 | 30 |
| Fe-redox (%) | 22 | 19 | 23 | 23 |
| Fe$^{2+}$ (as Fe$_2$O$_3$) (ppm) | 8 | 6.5 | 7 | 7 |
| Li$_2$O + Na$_2$O + K$_2$O | 11.4 | 11.7 | 18.4 | 13.8 |
| MgO + CaO + SrO + BaO | 14.4 | 13.4 | 6.7 | 5.1 |
| T2 (° C.) | 1567 | 1619 | 1601 | 1716 |
| T4 (° C.) | 1126 | 1159 | 1176 | 1213 |
| Tc (° C.) | | | <1154 | 1220 |
| Tc − T4 (° C.) | | | <−22 | 7 |
| TD (° C.) | 1429 | 1402 | 1437 | 1350 |
| D | 12 | 24 | 8.5 | 108.3 |
| Bubble density A (piece/kg) | more than 10$^4$ | more than 10$^4$ | more than 10$^4$ | |
| Bubble density B (piece/kg) | 1 | 1 | 1 | |
| Bubble density B/A | less than 1 × 10$^{-4}$ | less than 1 × 10$^{-4}$ | less than 1 × 10$^{-4}$ | |
| T_inner @200 mm | | | | |
| min | | | | |
| max | | | | |
| delta | | | | |

As apparent from Tables 1 to 14, in all the glasses of Working Examples (Examples 1 to 34 and 39 to 69), the value of D was 0 or more and the bubble disappearance-starting temperature (TD) was 1485° C. or lower. As a result, in the glasses of Working Examples (Examples 1 to 34 and 39 to 68), the bubble density B was 10 pieces/kg or less and the ratio of the bubble density B to the bubble density A (B/A) was 10$^{-3}$ or less. Moreover, the glasses of Working Examples (Examples 1 to 34 and 39 to 69) had a redox of 25% or less and thus the redox lowering was achieved.

On the other hand, in all the glasses of Comparative Examples (Examples 35 to 38), the value of D was less than 0 and the bubble disappearance-starting temperature (TD) was higher than 1485° C. As a result, the bubble density B was large such as more than 10 pieces/kg and the ratio (B/A) of the bubble density B to the bubble density A was more than 10$^{-3}$. Moreover, the redox was higher than 25% and thus the redox lowering was not able to be achieved.

In the glasses of Examples 1 to 5, 9 and 39 to 45, since the minimum value of the inner transmittance (wavelength: 400 to 700 nm) under the condition of light path length of 200 mm was high such as 80% or more and a difference between the maximum value and the minimum value of the inner transmittance is small such as 15% or less, it was found that they are suitable for the use as a light guide plate of an edge light type liquid crystal television. In addition, it was found that they are also suitable for building uses (interior materials and exterior materials) and other industrial uses (a cover glass for a solar power generation module).

While the present invention has been described in detail and with reference to specific embodiments thereof, it will be apparent to one skilled in the art that various changes and modifications can be made therein without departing from the intention and scope of the present invention. The present application is based on a Japanese patent application filed on Aug. 1, 2014 (Application No. 2014-157627) and a Japanese patent application filed on May 13, 2015 (Application No. 2015-097826), the entire thereof being incorporated herein by reference.

The invention claimed is:

1. A glass comprising 1 to 30 ppm of a total iron oxide (t-Fe$_2$O$_3$) in terms of Fe$_2$O$_3$, having a redox of 0% or more and 25% or less, comprising, as expressed by mass percentage based on oxides:
   SiO$_2$ 50 to 81%,
   Al$_2$O$_3$ 1 to 20%,
   B$_2$O$_3$ 0 to 5%,
   Li$_2$O+Na$_2$O+K$_2$O 5 to 20%, and
   MgO+CaO+SrO+BaO 5 to 27%,
   wherein the redox is a ratio of divalent iron in terms of Fe$_2$O$_3$ to a total of divalent iron and trivalent iron in terms of Fe$_2$O$_3$ ([divalent iron (Fe$^{2+}$) in terms of Fe$_2$O$_3$]/[total (Fe$^{2+}$+Fe$^{3+}$) of divalent iron (Fe$^{2+}$) and trivalent iron (Fe$^{3+}$) in terms of Fe$_2$O$_3$]),
   a bubble disappearance-starting temperature (TD) of the glass is 1485° C. or lower, and
   the glass has a minimum value of an inner transmittance along light path length of 200 mm in a wavelength range of 400 to 700 nm of 85% or more, and a difference between a maximum value and the minimum value of the inner transmittance is 13% or less.

2. A glass comprising 1 to 30 ppm of a total iron oxide (t-Fe$_2$O$_3$) in terms of Fe$_2$O$_3$, comprising, as expressed by mass percentage based on oxides:
   SiO$_2$ 50 to 81%,
   Al$_2$O$_3$ 1 to 20%,
   B$_2$O$_3$ 0 to 5%,
   Li$_2$O Na$_2$O+K$_2$O 5 to 20%, and
   MgO+CaO+SrO+BaO 5 to 27%,
   wherein a value of D represented by the following expression (1) of the glass is 0 or more, and a bubble disappearance-starting temperature (TD) of the glass is 1485° C. or lower:

$$D=4\times[SiO_2]+8\times[Al_2O_3]+2\times[MgO]-1\times[CaO]-2\times[SrO]-2\times[BaO]-8\times[Na_2O]-12\times[K_2O]-180 \quad (1)$$

wherein, as expressed by mass percentage based on oxides,
   [SiO$_2$] is the content of SiO$_2$,
   [Al$_2$O$_3$] is the content of Al$_2$O$_3$,
   [MgO] is the content of MgO,
   [CaO] is the content of CaO,
   [SrO] is the content of SrO,
   [BaO] is the content of BaO,
   [Na$_2$O] is the content of Na$_2$O, and
   [K$_2$O] is the content of K$_2$O, and
   the glass has a minimum value of an inner transmittance along light path length of 200 mm in a wavelength range of 400 to 700 nm of 85% or more, and a difference between a maximum value and the minimum value of the inner transmittance is 13% or less.

3. A glass comprising 1 to 30 ppm of a total iron oxide (t-$Fe_2O_3$) in terms of $Fe_2O_3$, comprising, as expressed by mass percentage based on oxides:
$SiO_2$ 50 to 81%,
$Al_2O_3$ 1 to 20%,
$B_2O_3$ 0 to 5%,
$Li_2O+Na_2O+K_2O$ 5 to 20%, and
$MgO+CaO+SrO+BaO$ 5 to 27%,
 wherein when a bubble density B is defined as that in a glass body obtained by melting glass raw materials at a temperature of 1550° C., followed by forming into a sheet and then annealing, the bubble density B of the glass is 10 pieces/kg or less, and
 the glass has a minimum value of an inner transmittance along light path length of 200 mm in a wavelength range of 400 to 700 nm of 85% or more, and a difference between a maximum value and the minimum value of the inner transmittance is 13% or less.

4. The glass according to claim 3, wherein a ratio (B/A) of the bubble density B to a bubble density A is $10^{-3}$ or less, wherein the bubble density A is defined as that in a glass body obtained by melting glass raw materials at a temperature of 1350° C., followed by forming into a sheet and then annealing.

5. The glass according to claim 1, wherein a content of divalent iron ($Fe^{2+}$) in terms of $Fe_2O_3$ in the glass is 50 ppm or less.

6. The glass according to claim 1, wherein a content of $Al_2O_3$ as expressed by mass percentage is 1 to 10%.

7. The glass according to claim 1, wherein a content of $Li_2O+Na_2O+K_2O$ is 5 to 15%.

8. The glass according to claim 1, wherein a content of $MgO+CaO+SrO+BaO$ is 13 to 27%.

9. The glass according to claim 1, comprising, as expressed by mass percentage based on oxides:
$SiO_2$ 50 to 81%,
$Al_2O_3$ 1 to 10%,
$B_2O_3$ 0 to 5%,
$Li_2O$ 0 to 5%,
$Na_2O$ 5 to 15%,
$K_2O$ 0 to 7.5%,
MgO 0 to 15%,
CaO 0 to 15%,
SrO 0 to 15%,
BaO 0 to 15%,
$Li_2O+Na_2O+K_2O$ 5 to 15%, and
$MgO+CaO+SrO+BaO$ 13 to 27%.

10. The glass according to claim 1, wherein the glass is substantially free from $B_2O_3$.

11. The glass according to claim 1, further comprising more than 0% and 0.5% or less of $SO_3$ as expressed by mass percentage.

12. The glass according to claim 1, wherein a content of $SnO_2$ as expressed by mass percentage is 1% or less.

13. The glass according to claim 1, wherein a total content of $Sb_2O_3$ and $As_2O_3$ as expressed by mass percentage is 0.5% or less.

14. The glass according to claim 1, wherein a content of $CeO_2$ as expressed by mass percentage is 0.05% or less.

15. The glass according to claim 1, wherein the glass has a temperature (T2) at which a viscosity of a glass melt reaches $10^2$ dPa·s of 1550° C. or lower.

16. The glass according to claim 1, wherein a difference (Tc-T4) between a devitrification temperature (Tc) of the glass and a temperature (T4) at which a viscosity of a glass melt reaches $10^4$ dPa·s is 100° C. or lower.

17. A glass sheet comprising the glass according to claim 1.

18. The glass sheet according to claim 17, wherein the glass sheet has a length of at least one side thereof of 200 mm or more and a thickness of 0.5 mm or more.

19. A method for producing the glass sheet according to claim 17, comprising:
 melting glass materials to obtain a molten glass; and
 forming the molten glass by using any one forming method selected from the group consisting of a float process, a roll-out process, a pulling-up process, and a fusion process to obtain a glass sheet, wherein a maximum melting temperature in melting the glass raw materials is in a range of the bubble disappearance-starting temperature (TD) of the glass to TD+150° C.

20. The glass according to claim 1, wherein a value of D represented by the following expression (1) of the glass is 20.8 or more:

$$D=4\times[SiO_2]+8\times[Al_2O_3]+2\times[MgO]-1\times[CaO]-2\times[SrO]-2\times[BaO]-8\times[Na_2O]-12\times[K_2O]-180 \quad (1)$$

wherein, as expressed by mass percentage based on oxides,
[$SiO_2$] is the content of $SiO_2$,
[$Al_2O_3$] is the content of $Al_2O_3$,
[MgO] is the content of MgO,
[CaO] is the content of CaO,
[SrO] is the content of SrO,
[BaO] is the content of BaO,
[$Na_2O$] is the content of $Na_2O$, and
[$K_2O$] is the content of $K_2O$.

* * * * *